Jan. 30, 1945.  E. H. WITTENBERG  2,368,281
PRESSURE RELEASE VALVE
Filed July 24, 1941
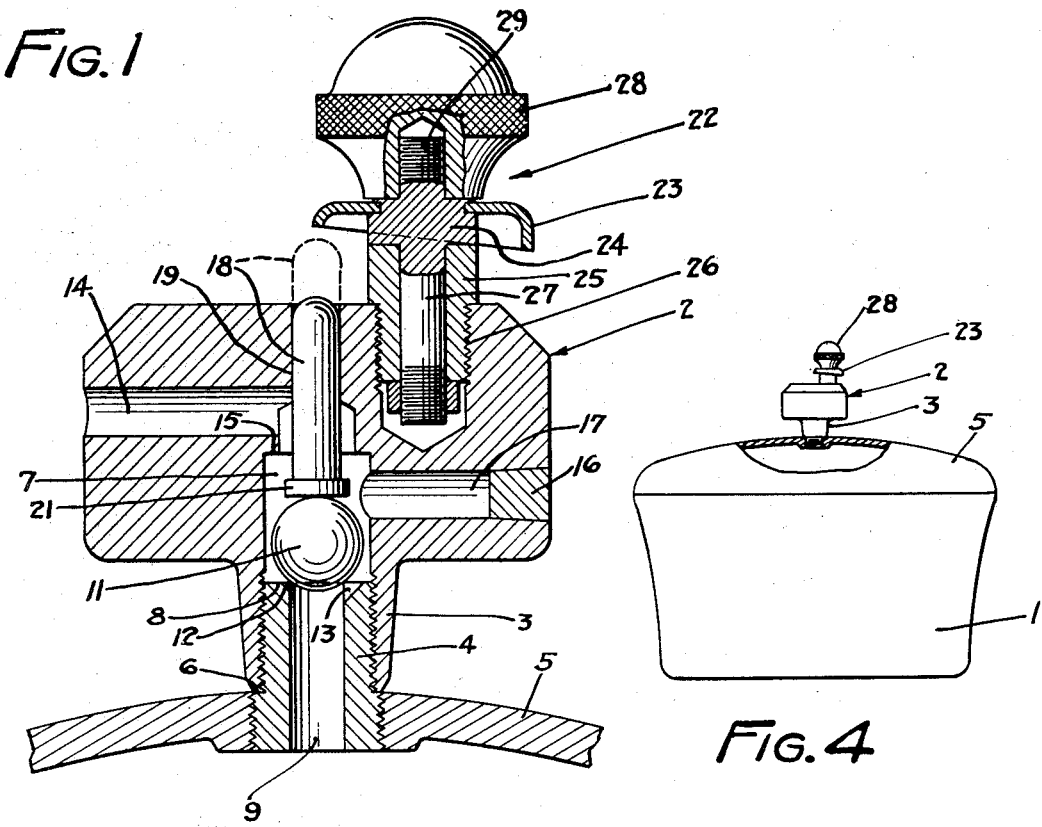
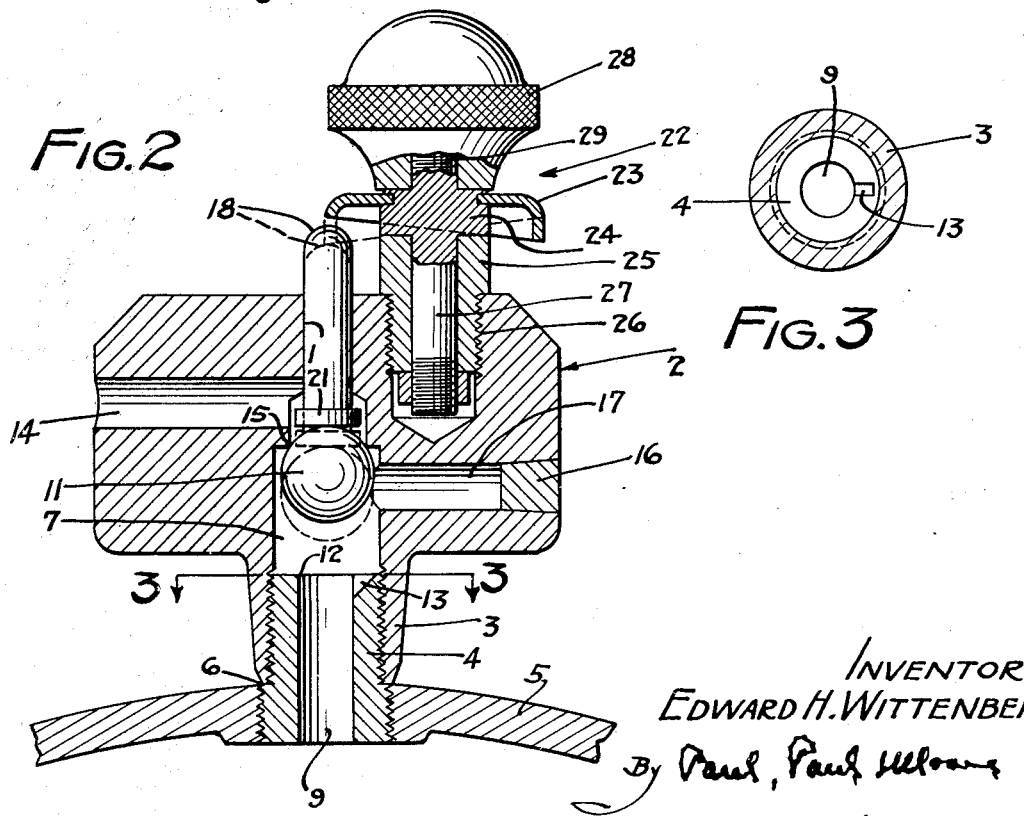
INVENTOR
EDWARD H. WITTENBERG
By Paul, Paul Moore
ATTORNEYS Patented Jan. 30, 1945

2,368,281

UNITED STATES PATENT OFFICE 2,368,281

PRESSURE RELEASE VALVE

Edward H. Wittenberg, Eau Claire, Wis., assignor to National Pressure Cooker Company, Eau Claire, Wis., a corporation of Wisconsin Application July 24, 1941, Serial No. 403,874

1 Claim. (Cl. 251—131)

This invention relates to new and useful improvements in pressure release valves and more particularly to such valves adapted for use on pressure cookers.

In the operation of pressure cookers, it is highly desirable that means be provided for releasing the atmospheric pressure or air within the cooker body before the cooking operation is actually started. If the air trapped within the cooker body, when the cover is secured thereto, is not released from the cooker body before the cooking operation is started, the flavor of the food may be affected. Means has heretofore been provided for releasing from the cooker body, air trapped therein when the cover is secured to the cooker body. Such means are usually in the form of a manually operable valve, or the like, which requires the attention of an attendant or person to manipulate it, when the cooker is initially started, first to open it to permit air in the cooker body to escape, after which it must be closed before the cooking operation can effectively proceed.

The present invention pertains to a novel pressure release valve for pressure cookers having means embodied therein for releasing air trapped within the cooker body, when the cover is initially secured thereto, and an object of the invention is to provide such a pressure release valve adapted to automatically release the air from the cooker and thereafter seal the air release duct, when the air has been released from the cooker, thereby greatly facilitating the operation of the pressure cooker.

A further object of the present invention is to provide an automatically operable pressure release valve which, when initially started, has a small vent which is open to the atmosphere to permit air trapped within the cooker body to escape therefrom, and which operates automatically to close said air release opening, when a predetermined pressure is developed within the cooker body, whereby the cooking operation may proceed, said vent also functioning to prevent the formation of a vacuum within the cooker, when the latter is allowed to cool with the cover secured thereto.

A further object is to provide a pressure release valve comprising a body having a valve chamber therein provided with a passage for connecting it to a pressure chamber, and a valve seat being provided at the inner end of said passage which normally is closed by a suitable check valve, and an air vent being provided in said valve seat for constantly establishing communication between said passage and the valve chamber, and a second passage being provided in said body for establishing communication between the valve chamber and the atmosphere, said second passage having a valve seat adapted to be engaged by the valve within said chamber, when a predetermined pressure is developed in the pressure cooker, whereby the vent is closed, after which pressure may develop within the cooker body.

A further object is to provide a blow-off valve for pressure cookers comprising a valve chamber provided with valve seats at its lower and upper ends adapted to be alternately engaged by a valve provided within the chamber, one end of said valve chamber having a passage connecting it to the interior of the pressure cooker, and the opposite end being in communication with the atmosphere, and an air vent being provided in the lower valve seat through which air initially trapped within the cooker body may escape to the atmosphere, said valve being adapted to be moved into engagement with the upper valve seat to prevent further escape of pressure from the pressure cooker, when a predetermined pressure is reached therein, and manually operable means being provided on said body for unseating the valve from its upper seat to release the internal pressure of the cooker body.

A further object is to provide a blow-off valve for pressure cookers comprising a body having a valve chamber therein provided with a passage at its lower end for connecting it to the interior of the pressure cooker, said passage having a valve seat at its upper end adapted to be engaged by a suitable valve provided within the valve chamber, and a second passage connecting the upper end of the valve chamber to the atmosphere and having a valve seat adapted to be engaged by said valve, when a predetermined pressure is reached within the cooker body, and a fusible plug being provided in a wall of the valve chamber, whereby should the pressure within the cooker body become excessive, said plug may be blown to release the internal pressure of the cooker.

A further object is to provide a blow-off valve comprising a body having a valve chamber therein provided with a passage at its lower end adapted to be connected to the interior of a pressure cooker, and a valve seat being provided at the upper end of said passage, which normally is closed by a gravity operated valve mounted within the valve chamber, and a second passage connecting the upper end of the valve chamber to the atmosphere and having a valve seat adapted to be engaged by the valve, when a predetermined pressure is reached within the pressure cooker and valve chamber, and a valve release pin being mounted in said body and operable by a cam device to unseat the valve, whereby the pressure within the cooker body may be conveniently released therefrom by manipulation of said cam device.

Other objects of the invention reside in the novel arrangement of the ball valve within the valve chamber, whereby it normally closes the passage between said chamber and the interior of the pressure cooker, but permits air within the cooker body to escape to the atmosphere, when the cooker is initially started, said valve being adapted to be automatically unseated and moved into engagement with a second seat to completely shut off the escape of pressure from the cooker body; in the means provided for manually unseating the valve to release the internal pressure of the cooker body at the end of the cooking period; in the provision of a fusible plug which is exposed to the pressure or temperature within the valve chamber, whereby when the internal pressure of the cooker becomes excessive, the plug will be blown to automatically release such pressure from the cooker; in the unique construction of the cam device provided on the valve body for actuating the valve unseating pin; and, in the simple and inexpensive construction of the device as a whole, whereby it may be manufactured in quantity production at small cost.

Other objects of the invention will appear from the following description and accompanying drawing and will be pointed out in the annexed claim.

In the accompanying drawing there has been disclosed a structure designed to carry out the various objects of the invention, but it is to be understood that the invention is not confined to the exact features shown as various changes may be made within the scope of the claim which follows.

In the drawing:

Figure 1 is a view showing the blow-off valve in its normal condition wherein it will be noted that the ball valve is engaged with its lower seat;

Figure 2 is a view showing the valve engaged with its upper seat to prevent the escape of pressure from the cooker body, and showing in dotted lines the valve unseating means actuated to unseat the valve, as when releasing the pressure from the cooker body when the cooking period has been terminated;

Figure 3 is a sectional plan view on the line 3—3 of Figure 2; and

Figure 4 is a miniature view of a pressure cooker with the invention applied to the usual cover thereof.

In the selected embodiment of the invention herein disclosed, there is illustrated in Figure 4, for purposes of disclosure, a conventional pressure cooker comprising a body 1 provided with a suitable cover 5, adapted to be secured to said body in leak-tight relation by suitable means, not shown in the drawing.

The novel pressure release valve herein disclosed is shown comprising a body 2 having a depending portion 3 threaded to receive a nipple 4, the lower end of which may be arranged in threaded engagement with the cover 5 of the pressure cooker, as shown. The nipple 4 is preferably provided with an annular shoulder 6 adapted to engage the lower end of the portion 3, when the nipple is screwed thereinto.

The body 2 has a valve chamber 7 therein, the bottom 8 of which is defined by the upper end of the nipple 4, the latter having a passage 9 therein, which is adapted to establish communication between the valve chamber and the interior of the pressure cooker, as will readily be understood.

A suitable valve 11, preferably spherical in form, is provided within the valve chamber 7 and is normally engaged with a valve seat 12, provided at the upper end of the passage 9, as shown in Figure 1. One or more small air vents or grooves 13 may be provided in the valve seat 12, whereby the passage 9 is constantly in communication with the valve chamber 7 through the air vent 13.

The upper end of the valve chamber has a second passage 14 connecting it to the atmosphere. A valve seat 15 is provided at the upper end of the valve chamber and is adapted to be engaged by the valve 11, as shown in Figure 2, when the pressure within the cooker body reaches a predetermined figure. When the valve 11 engages the seat 15, further escape of pressure from the cooker body is completely cut off.

To avoid damage to the cooker, as a result of abnormal pressure, a suitable fusible plug 16 is mounted in the body 2 and is subjected to the internal pressure of the valve chamber 7 through a suitable passage 17. Should the pressure within the valve chamber become excessive, the fusible plug 16 may be blown from the body 2, thereby releasing the pressure from the cooker.

Means is provided for manually unseating the valve 11 from the upper seat 15, when it is desired to quickly release the internal pressure of the cooker body. Such means is shown comprising a valve unseating pin 18, slidable in a guide 19 provided in the upper portion of the body 2. The pin 19 preferably has a head 21 at its lower end which may constantly engage the ball valve 11, as shown in Figures 1 and 2.

A cam-actuated device, generally designated by the numeral 22, is mounted on the body 2 and is shown comprising a cam 23 secured to a stud 24 mounted for rotation in a suitable guide 25, shown secured to the body 2 by suitable threads 26. The stud 24 has a reduced portion or stem 27 rotatably supported in the guide 25, as clearly illustrated in the drawing. A finger knob 28 is secured to the upper threaded terminal 29 of the stud 24, whereby the cam 23 may be conveniently rotated from the position shown in Figure 1 to that shown in dotted lines in Figure 2, thereby to depress the valve unseating pin 18 to unseat the valve 11, as shown in dotted lines in Figure 2.

The operation of the novel pressure release or blow-off valve herein disclosed is as follows:

When the cover 5 is initially secured in seal-tight position on the cooker body, the valve 11 is engaged with the lower seat 12, whereby all air trapped within the cooker body may gradually escape through the restricted passage 13, valve chamber 7, and passage 14 to the atmosphere. As soon as all of the air has been ejected from within the pressure cooker, steam generating therein may momentarily escape through the restricted passage 13 until the pressure within the pressure cooker becomes sufficient to lift the valve 11 into engagement with the upper seat 15, as shown in full lines in Figure 2. As soon as the valve engages the upper seat 15, further escape of pressure from the cooker body is cut off.

As soon as the cooking period approaches the end of its required time interval, the cam device 23 is manipulated by rotating the finger knob 28 until the cam 23 engages the upper end of the pin 18 and depresses it sufficiently to unseat the valve 11 from its upper seat 15. The unseating of the valve 11 may be conveniently controlled by manipulation of the finger knob 28, to permit the steam or pressure within the cooker body to escape gradually or quickly, as may be desired. It is to be understood that in the operation of pressure cookers, it is of utmost importance that the pressure within the cooker body be released before an attempt is made to release the cover therefrom.

Should an attendant inadvertently overlook releasing the valve from the cooker body by manipulation of the cam device 22, the fusible plug 16 will automatically provide an escape for the internal pressure of the cooker body, when the pressure therein becomes excessive, thereby eliminating all danger of the cooker body becoming damaged as a result of excessive pressure.

By the employment of the novel pressure release valve herein disclosed, the operation of releasing the air from within the cooker body, when the cooker is initially started, is accomplished automatically, which greatly facilitates the operation of the cooker and assures the prepared foods to be of finer flavor, as the flavor thereof cannot be affected by the permeation of entrapped air within the cooker body.

I claim as my invention:

A pressure release valve comprising a body having a bore therein threaded at one end, a nipple received in threaded engagement with said bore and cooperating therewith to define a valve chamber, said nipple having an intake passage therein communicating with the valve chamber, a valve seat at the inner end of said passage, a ball valve within the valve chamber normally engaging said seat, said valve body having an exhaust therein communicating with the opposite end of the valve chamber, a valve seat at the inner end of the exhaust passage adapted to be engaged by the ball valve to close the exhaust, a small notch in the valve seat of the intake passage thru which fluid may escape when pressure initially developes within said intake passage, a valve unseating pin slidably mounted in the valve body, means for preventing accidental removal of said pin from its guide, a threaded bushing received in threaded engagement with the valve body and having a bore therein, a stem rotatably mounted in the bore of said bushing, a manually operable cam element secured to said stem adapted to engage and axially move the valve-unseating pin into engagement with the ball valve to unseat the valve from the exhaust valve seat, and thereby release the pressure in the valve chamber.

EDWARD H. WITTENBERG.